(12) United States Patent
Koyama et al.

(10) Patent No.: US 7,989,099 B2
(45) Date of Patent: Aug. 2, 2011

(54) INFORMATION MEDIUM SUBSTRATE AND INFORMATION MEDIUM

(75) Inventors: Atsushi Koyama, Tokyo (JP); Teppei Osawa, Tokyo (JP); Tomoki Ushida, Tokyo (JP); Kentaro Iida, Tokyo (JP); Mamoru Usami, Tokyo (JP); Hideki Hijikata, Tokyo (JP)

(73) Assignee: TDK Corporation, Tokyo (JP)

( * ) Notice: Subject to any disclaimer, the term of this patent is extended or adjusted under 35 U.S.C. 154(b) by 762 days.

(21) Appl. No.: 11/753,667

(22) Filed: May 25, 2007

(65) Prior Publication Data
US 2007/0274195 A1    Nov. 29, 2007

(30) Foreign Application Priority Data

May 26, 2006  (JP) ................... 2006-146363
Apr. 9, 2007  (JP) ................... 2007-101258

(51) Int. Cl.
*G11B 7/24* (2006.01)
*G11B 5/78* (2006.01)
*B05D 5/12* (2006.01)

(52) U.S. Cl. ............... 428/848.6; 428/848.1; 360/99.05; 360/135; 369/280

(58) Field of Classification Search ............... 428/848.4, 428/900, 848.6, 332, 66.7, 66.4, 64.2, 848.1, 428/90, 64.29; 360/135, 98.08, 99.05, 98.01, 360/99.12, 245.2, 122; 264/107; 369/94, 369/291, 275.4, 275.1, 275.2, 275.3, 280, 369/281, 291.1; 156/379.6; 720/711
See application file for complete search history.

(56) References Cited

U.S. PATENT DOCUMENTS

| 1,111,999 | A | * | 9/1914  | Edison ........................ 428/332 |
| 3,212,075 | A | * | 10/1965 | Damerau et al. ............. 360/135 |
| 3,787,274 | A | * | 1/1974  | Genma ........................ 428/64.2 |
| 3,840,897 | A | * | 10/1974 | Kelley et al. ............... 360/99.05 |
| 4,351,047 | A | * | 9/1982  | Redlich et al. .............. 369/270.1 |
| 4,623,570 | A | * | 11/1986 | Alexander et al. ........ 428/848.4 |
| 4,887,178 | A | * | 12/1989 | McCracken et al. ......... 360/135 |
| 4,963,209 | A | * | 10/1990 | Chernega et al. ............ 428/900 |
| 5,751,055 | A | * | 5/1998  | Maruyama et al. ......... 428/66.7 |
| 6,011,771 | A | * | 1/2000  | Akama et al. ................ 720/711 |
| 6,130,801 | A | * | 10/2000 | Cheng et al. ............... 360/98.08 |
| 6,537,423 | B1 | * | 3/2003 | Ebisawa et al. ........... 156/379.6 |
| 6,677,024 | B2 | * | 1/2004 | Jousse et al. ................ 428/66.4 |
| 6,863,948 | B2 | * | 3/2005 | Endo ........................... 428/848.6 |

(Continued)

FOREIGN PATENT DOCUMENTS

JP    63-129273    8/1988

(Continued)

OTHER PUBLICATIONS

Kozo et al; JP 2001-043570; Feb. 2001 Abstract.*

(Continued)

*Primary Examiner* — Kevin M. Bernatz
*Assistant Examiner* — Louis Falasco
(74) *Attorney, Agent, or Firm* — Greenblum & Bernstein, P.L.C.

(57) ABSTRACT

An information medium substrate is formed as a flat plate and includes a first convex part formed on one surface of the information medium substrate in a region between a rim part of a center hole and an inner circumferential edge of an information region and a second convex part formed on another surface of the information medium substrate at a position that overlaps a protruding end part of the first convex part in a thickness direction of the information medium substrate.

8 Claims, 9 Drawing Sheets

U.S. PATENT DOCUMENTS

| | | |
|---|---|---|
| 7,401,347 B2 | 7/2008 | Hayashi et al. |
| 2002/0057645 A1* | 5/2002 | Kishima .................... 369/275.4 |
| 2003/0147340 A1* | 8/2003 | Oshima et al. ................ 369/280 |
| 2003/0161068 A1* | 8/2003 | Tokizaki .................... 360/98.08 |
| 2003/0161255 A1* | 8/2003 | Kikuchi et al. ............... 369/280 |
| 2004/0027985 A1* | 2/2004 | Inoue ............................ 369/291 |
| 2004/0136312 A1* | 7/2004 | Hayashi et al. ............ 369/275.1 |
| 2004/0208107 A1* | 10/2004 | Yamaga et al. ................. 369/94 |
| 2004/0212122 A1* | 10/2004 | Koyama et al. ............... 264/107 |
| 2004/0234261 A1* | 11/2004 | McIntyre et al. ............. 396/661 |
| 2005/0118382 A1* | 6/2005 | Hobon et al. ................ 428/66.7 |
| 2005/0180305 A1* | 8/2005 | Yokota et al. .............. 369/275.4 |
| 2006/0044992 A1* | 3/2006 | Satoh et al. ................ 369/272.1 |
| 2006/0073284 A1* | 4/2006 | Usami et al. .................. 427/508 |

FOREIGN PATENT DOCUMENTS

| | | |
|---|---|---|
| JP | 5-166226 | 7/1993 |
| JP | 9-167386 | 6/1997 |
| JP | 9-219038 | 8/1997 |
| JP | 2001-023238 | 1/2001 |
| JP | 2001043570 | * 2/2001 |
| JP | 2004-296064 | 10/2004 |
| JP | 2004-538590 | 12/2004 |

OTHER PUBLICATIONS

Kozo et al; JP 2001-043570; Feb. 2001 Machine English Translation.*

* cited by examiner

F I G. 1 6
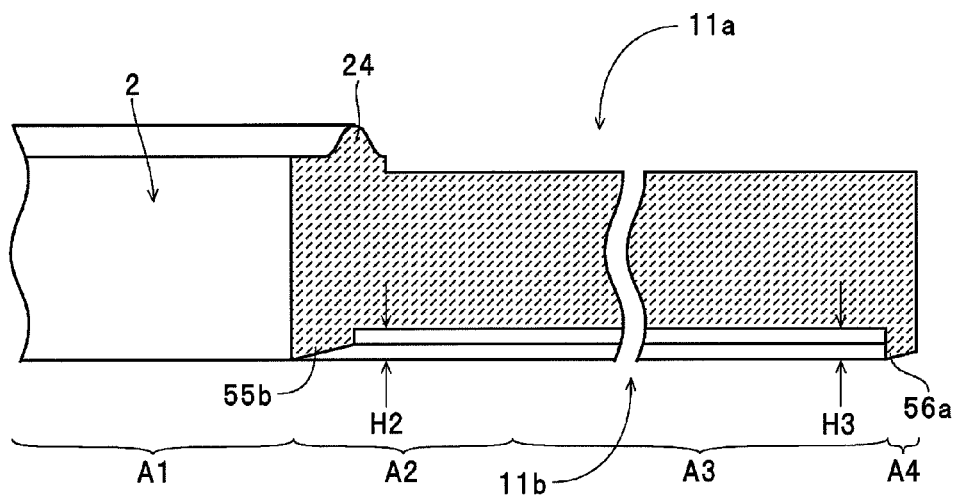
F I G. 1 7
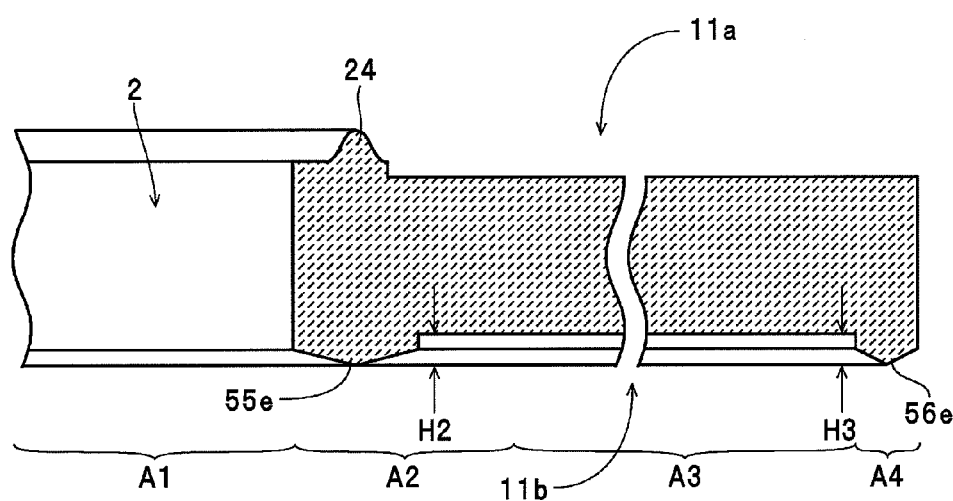

INFORMATION MEDIUM SUBSTRATE AND INFORMATION MEDIUM

BACKGROUND OF THE INVENTION

1. Field of the Invention

The present invention relates to an information medium substrate that functions as a support for various functional layers of an information medium and to an information medium manufactured using such information medium substrate.

2. Description of the Related Art

One example of an information medium manufactured using this type of information medium substrate is the optical disc disclosed by Japanese Laid-Open Patent Publication No. 2001-43570. This optical disc includes a substrate produced by injection molding polycarbonate resin, a reflective film formed so as to cover an information recording surface of the substrate, and a protective film formed of an acrylic UV-curable resin so as to cover the reflective film. A stacking ring (a convex part that is ring-shaped in planar form) with a height of around 0.2 mm is formed on one surface of the substrate (i.e., a surface that is a rear surface of the information recording surface and is on the side of the optical disc where a laser beam used for reading, etc., is incident). A ring spacer (a convex part that is ring-shaped in planar form) with a height of around 0.3 mm is also formed on the surface of the protective film by screen printing using an acrylic UV-curable resin.

The stacking ring and the ring spacer described above are formed with the same diameter at overlapping positions in the thickness direction of the optical disc. Accordingly, when a plurality of optical discs are stacked, the protruding end part of the ring spacer of an optical disc positioned above will contact the protruding end part of the stacking ring of the optical disc positioned below. In this way, for each pair of adjacent optical discs that are above and below one another in a stack of optical discs, surface contact between the surface of the substrate of one optical disc and the surface of the protective film of the other optical disc is avoided. As a result, when a plurality of optical discs are stacked, a situation where the optical discs tightly contact one another and stick together and a situation where damage occurs for the substrate can be avoided.

SUMMARY OF THE INVENTION

However, by investigating the above conventional optical disc, the present inventors found the following problem. The conventional optical disc uses a construction where a ring spacer is formed on the surface of the protective film by screen printing using a UV-curable resin. Accordingly, during the manufacturing of such optical disc, when a plurality of preforms where the reflective film and the protective film have been formed on the information recording surface of the substrate (i.e., preforms for which the ring spacer and the like will be formed later by printing) are stacked by passing a stacking pole through the preforms, the stacking ring formed on each substrate will contact the surface of a protective film of another preform, resulting in the preforms being separated by the height of the stacking ring. This means that for conventional optical discs, it is necessary to form the stacking ring on the substrate with sufficient height to prevent optical discs from tightly contacting one another and sticking together and also to prevent damage to the substrate and/or the protective film when preforms (or optical discs) are stacked before the formation of the ring spacer is completed.

On the other hand, to raise the recording density of information media, there are current trends to reduce the wavelength of the laser beams used for recording and reproducing and to increase the numerical aperture of the objective lens of a pickup. Accordingly, when recording and reproducing data, it is necessary to position the pickup sufficiently close to the optical disc. This means that when a high stacking ring has been formed like on the conventional optical disc (in the above example, a ring that is 0.2 mm high), there is the risk of the pickup that is positioned close to the optical disc during the recording and reproducing of data contacting the stacking ring, resulting in the risk of recording/reproducing errors, damage to the pickup, and damage to the optical disc. Among current optical discs, there are also optical discs where data is recorded and reproduced by having a laser beam transmitted through a resin layer that is around 100 μm thick formed on one surface of a substrate. For this type of optical disc, the information recording surface (the "one surface" of the substrate above) of this type of conventional optical disc is used as the label surface. Accordingly, if a stacking ring of a certain height (in this example, 0.2 mm) has been formed on the one surface of a substrate, there is a risk of a printing apparatus contacting the stacking ring during a print process carried out on the label surface, which obstructs the printing of the label.

In this way, with current optical discs being produced with higher recording densities, it is difficult to form a high stacking ring on the one surface of the substrate. Accordingly, if current optical discs are produced using the conventional optical disc construction, when preforms (or optical discs) are stacked before the formation of the ring spacer has been completed, there is the risk of the preforms (i.e., the optical discs during manufacturing) tightly contacting one another and sticking together and of damage to the substrate and/or the protective film.

The present invention was conceived in view of the problem described above and it is a principal object of the present invention to provide an information medium substrate and an information medium where tight contact and damage during stacking can be avoided without recording/reproducing processes, a printing process, and the like being obstructed.

An information medium substrate according to the present invention is formed as a flat plate and includes: a first convex part formed on one surface of the information medium substrate in a region between a rim part of a center hole and an inner circumferential edge of an information region; and a second convex part formed on another surface of the information medium substrate at a position that overlaps a protruding end part of the first convex part in a thickness direction of the information medium substrate. Note that the expression "information region" for the present invention refers to a region in which a recording layer where data can be recorded is formed on a recordable information medium and to a region where pits and/or marks that construct data are formed on a read-only information medium.

According to the above information medium substrate, by forming the first convex part on the one surface in a region between the rim part of the center hole and the inner circumferential edge of the information region and forming the second convex part on the other surface at a position that overlaps the protruding end part of the first convex part in the thickness direction, when a plurality of the information medium substrates are stacked during the manufacturing of information media in a state where a first functional layer has been formed on the one surface of the information medium substrates (i.e., in a state where the second functional layer has not been formed on the other surface of the information medium substrates), the respective first functional layers and information medium substrates can be sufficiently separated by a distance equal to the total of the heights of the first convex part and the second convex part. Accordingly, even if the first convex part is formed sufficiently low so as to avoid recording/reproducing errors and the like, it will still be possible to reliably prevent the stacked information medium substrates from sticking together and to reliably avoid damage to the information medium substrate and the first functional layer. Also, since there is no excessively high convex part, it is possible to avoid a situation where recording/reproducing processes and print processes on a label surface are obstructed due to the presence of a convex part.

With the information medium substrate according to the present invention, at least one out of the first convex part and the second convex part may be formed so as to be ring-shaped in planar form. By using this construction, when a plurality of the information medium substrates are stacked, regardless of the rotational position of an upper information medium substrate relative to a lower information medium substrate during stacking, reliable contact will be made between the first convex part of the lower information medium substrate and the second convex part of the upper information medium substrate or between the second convex part of the lower information medium substrate and the first convex part of the upper information medium substrate. Accordingly, it will be possible to reliably keep the respective first functional layers and information medium substrates separated by the total of the heights of the convex parts.

In addition, with the information medium substrate according to the present invention, one out of the first convex part and the second convex part may be formed so as to be ring-shaped in planar form and the other out of the first convex part and the second convex part may be constructed of a plurality of arc-shaped convex parts that are adjacent in a circumferential direction of the information medium substrate with predetermined gaps in between. By using this construction, when a plurality of information medium substrates are stacked, it will be possible for air in the periphery to easily enter a space between an information medium substrate positioned above and an information medium substrate positioned below. Accordingly, when an information medium substrate positioned above is lifted off the stack, it is possible to avoid a state where the space described above between the information medium substrate and the information medium substrate positioned below remains sealed, and as a result it is possible to avoid having the information medium substrate positioned below lifted off together with the information medium substrate above (i.e., where the information medium substrate positioned below sticks to the information medium substrate above). This makes it possible to lift off only the information medium substrate positioned above.

In addition, with the information medium substrate according to the present invention, at least one out of the first convex part and the second convex part may be formed so that a top part thereof is a narrow ridge in the circumferential direction of the information medium substrate. Note that the expression "narrow ridge" for the present invention and the inventions described later refers to a state where the top part (ridge line) of the convex part has an extremely narrow width and is continuous or discontinuous. With this construction, when a plurality of information medium substrates are stacked, it will be possible for air in the periphery to easily enter a space between an information medium substrate positioned above and an information medium substrate positioned below from the contacting part of the first convex part and the second convex part. Therefore, according to this information medium substrate, when an information medium substrate positioned above is lifted off a stack, for example, it is possible to avoid a state where the space described above between the information medium substrate and the information medium substrate positioned below remains sealed, and as a result it is possible to avoid having the information medium substrate positioned below lifted off together with the information medium substrate above (i.e., where the information medium substrate positioned below sticks to the information medium substrate above). This makes it possible to lift off only the information medium substrate positioned above.

Also, with the information medium substrate according to the present invention, a third convex part may be formed in a region outside the information region on at least one out of the one surface and the other surface. With this construction, when a plurality of information medium substrates are stacked, even if the information medium substrates are inclined, the third convex part of an information medium substrate positioned above will contact the surface of an information medium substrate positioned below, for example, thereby making it possible to reliably avoid surface contact between the information medium substrates. Accordingly, for stacked information medium substrates, it is possible to prevent the information medium substrates from sticking together and to avoid damage even more reliably.

Also, with the information medium substrate according to the present invention, the third convex part may be constructed of a plurality of arc-shaped convex parts that are adjacent in a circumferential direction of the information medium substrate with predetermined gaps in between. With this construction, when a plurality of the information medium substrates are stacked, it will be possible for air in the periphery to easily enter the space between an information medium substrate positioned above and an information medium substrate positioned below from the predetermined gaps. When an information medium substrate positioned above is lifted off the stack, for example, it is possible to avoid a state where the space described above between the information medium substrate and an information medium substrate positioned below remains sealed, and as a result it is possible to avoid having the information medium substrate positioned below lifted off together with the information medium substrate above (i.e., where the information medium substrate positioned below sticks to the information medium substrate above). This makes it possible to lift off only the information medium substrate positioned above.

Also, with the information medium substrate according to the present invention, the third convex part may be formed so that a top part thereof is a narrow ridge in the circumferential direction of the information medium substrate. With this construction, when a plurality of the information medium substrates are stacked, it will be possible for air in the periphery to easily enter the space between an information medium substrate positioned above and an information medium substrate positioned below from the contacting part of the one surface of an information medium substrate and the third convex part. Therefore, according to this information medium substrate, when an information medium substrate positioned above is lifted off the stack, for example, it is possible to avoid a state where the space described above between the information medium substrate and an information medium substrate positioned below remains sealed, and as a result it is possible to avoid having the information medium substrate positioned below lifted off together with the information medium substrate above (i.e., where the information medium substrate positioned below sticks to the information medium substrate above). This makes it possible to lift off only the information medium substrate positioned above.

An information medium according to the present invention includes: a first functional layer formed by applying a first resin material onto the one surface of any of the information medium substrates described above so as to cover the first convex part; and a second functional layer formed by applying a second resin material onto a region outside the second convex part on the other surface of the information medium substrate so that a height of the second functional layer in the thickness direction is equal to or greater than a height of the second convex part. Note that the first functional layer and the second functional layer for the present invention are not respectively limited to single layers and include layers where two or more layers (or thin films) together function as a single functional layer. Also, for a construction where two or more functional layers are formed on a surface of the information medium substrate, the multilayer structure composed of such two or more functional layers corresponds to a "functional layer" for the present invention.

With the above information medium, during a print process on a print layer as the second functional layer, it is possible to reliably avoid a situation where printing is obstructed by a printing apparatus catching on the second convex part.

Another information medium according to the present invention includes: a first functional layer formed by applying a first resin material onto the one surface of any of the information medium substrates described above so as to cover the first convex part; and a second functional layer formed by applying a second resin material onto the other surface of the information medium substrate so as to cover the second convex part.

With the above information medium, it is possible to achieve a state where the second convex part protrudes outward on the other surface side not only for a preform during manufacturing an information medium but also for a completed information medium. Accordingly, even if the second convex part is formed very low, when a plurality of the completed information media are stacked, the first convex part formed on the one surface and the second convex part formed on the other surface will together reliably prevent surface contact between two information media. By doing so, when a plurality of the completed information media are stacked, it is possible to reliably prevent the information media from sticking together and to reliably avoid damage.

It should be noted that the disclosure of the present invention relates to the contents of Japanese Patent Application 2006-146363 that was filed on 26 May 2006 and Japanese Patent Application 2007-101258 that was filed on 9 Apr. 2007, the entire contents of both of which are herein expressly incorporated by reference.

BRIEF DESCRIPTION OF THE DRAWINGS

These and other objects and features of the present invention will be explained in more detail below with reference to the attached drawings, wherein:

FIG. 16 is a cross-sectional view of yet another disc substrate;

FIG. 17 is a cross-sectional view of yet another disc substrate;

DESCRIPTION OF THE PREFERRED EMBODIMENTS

Preferred embodiments of an information medium substrate and an information medium according to the present invention will now be described with reference to the attached drawings.

Figure 1:
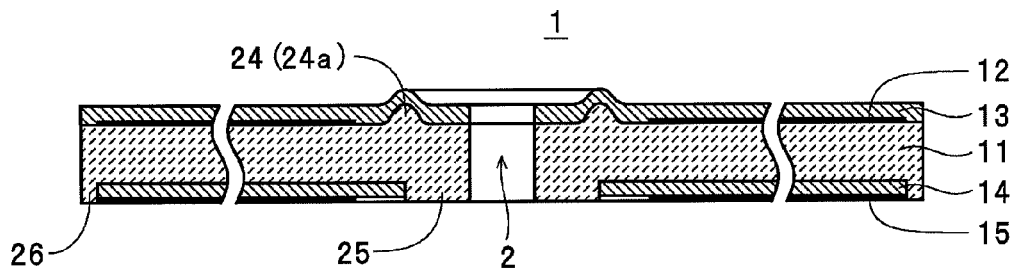
FIG. 1 is a cross-sectional view showing the construction of an optical disc.

The optical disc 1 shown in FIG. 1 is one example of an information medium according to the present invention and as one example is constructed so as to be capable of recording and reproducing data. The optical disc 1 is constructed by forming a recording layer 12 and a light transmitting layer 13 in the mentioned order on one surface (the upper surface in FIG. 1) of a disc substrate (a light transmitting substrate) 11 and also has an adjustment layer 14 and a print layer 15 formed in the mentioned order on the other surface (the lower surface in FIG. 1) of the disc substrate 11. An attachment center hole 2 for attaching the optical disc 1 to a recording/reproducing apparatus is formed in the center of the optical disc 1.

On the other hand, the disc substrate 11 is one example of an information medium substrate according to the present invention and is formed by injection molding in an overall circular plate shape (i.e., the shape of a flat plate) using a light-transmitting resin material. More specifically, to achieve the sufficiently high mechanical strength required for the optical disc 1, as one example, the disc substrate 11 is formed by injection molding a light-transmitting resin such as polycarbonate resin into a circular plate shape with a diameter of around 120 mm and a thickness of around 1.1 mm. Note that the material used to mold the disc substrate 11 is not limited to polycarbonate resin and it is possible to mold the disc substrate 11 using any of olefin resin, acrylic resin, epoxy resin, polystyrene resin, polyethylene resin, polypropylene resin, silicone resin, fluorine resin, ABS resin, and urethane resin.

Figure 2:
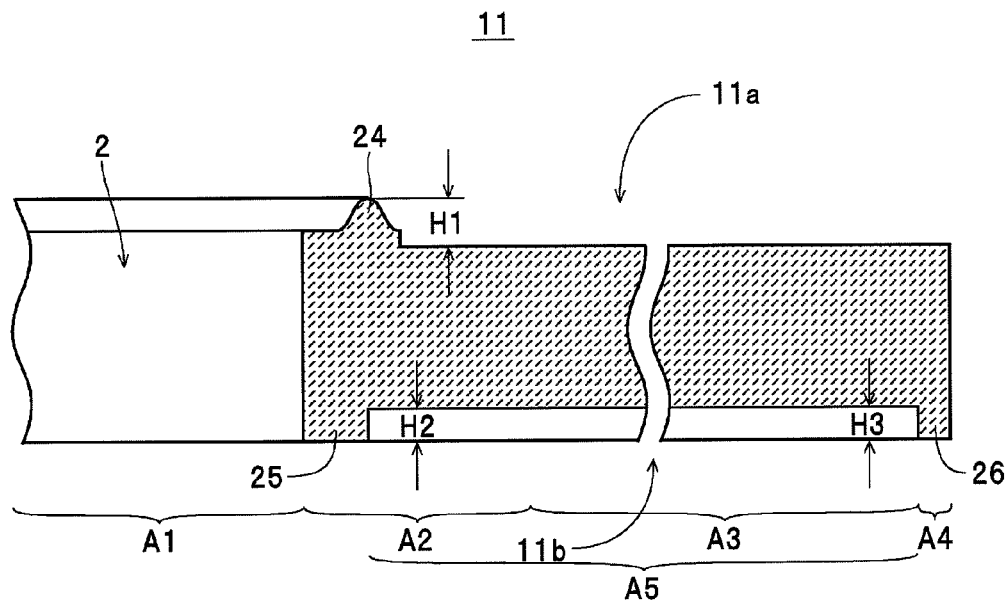
FIG. 2 is a cross-sectional view of a disc substrate.

As shown in FIG. 2, in the disc substrate 11, a convex part 24 corresponding to a "first convex part" for the present invention is formed on a surface 11a (one example of the "one surface" for the present invention) in a region (a chucking region A2) between a rim part of the attachment center hole 2 (i.e., the outer circumferential end of a center hole formation region A1) and an inner circumferential edge of an information region A3 where the recording layer 12 will be formed. The convex part 24 is formed so as to be ring-shaped in planar form and is formed so that the height H1 from the surface 11a is around 0.075 mm, for example. Also, with the disc substrate 11, the convex part 24 is formed so that a top part thereof is a narrow ridge in the circumferential direction of the disc substrate 11.

In addition, a convex part 25 corresponding to a "second convex part" for the present invention is formed on a rear surface 11b (one example of the "other surface" for the present invention) in the chucking region A2 between the rim part of the attachment center hole 2 (i.e., the outer circumferential end of the center hole formation region A1) and an inner circumferential edge of the information region A3 where the recording layer 12 will be formed. The convex part 25 is formed on the rear surface 11b at a position that overlaps the protruding end part of the convex part 24 described above in the thickness direction (the up-down direction in FIG. 2) so as to be ring-shaped in planar form, and as one example is formed so that the height H2 from the rear surface 11b is around 0.08 mm. Also, a convex part 26 that is one example of a "third convex part" for the present invention is formed on the rear surface 11b in an outer edge region A4 that is outside the information region A3. The convex part 26 is formed so as to be ring-shaped in planar form around the outer edge of the disc substrate 11 and as one example is formed so that the height H3 from the rear surface 11b is around 0.08 mm. That is, the convex part 26 and the convex part 25 are formed so as to have equal heights or substantially equal heights.

As one example, the recording layer 12 comprises a reflective film (not shown) including a metal material, a recording material layer (not shown) that includes a phase-change material, and at least a pair of dielectric layers (not shown) sandwiching the reflective film and the recording material layer, and is formed on the surface 11a of the disc substrate 11. Here, the reflective film and the recording material layer are formed on the surface 11a of the disc substrate 11 (an example construction for the case where the optical disc 1 is a rewritable information medium) in the mentioned order. Note that when the present invention is applied to a read-only information medium, a substrate in which pits are formed during injection molding is used in place of the disc substrate 11 of the optical disc 1 and a functional layer composed of a reflective film (not shown) including a metal material is formed on the surface 11a of the substrate in place of the recording layer 12.

The light transmitting layer 13 protects the recording layer 12 formed on the surface 11a of the disc substrate 11 and transmits laser beams used for recording and reproducing. Together with the recording layer 12 described earlier, the light transmitting layer 13 constructs a "first functional layer" for the present invention. More specifically, the light transmitting layer 13 is formed with a thickness of around 100 μm by applying a UV-curable resin (one example of a "first resin material" for the present invention) such as acrylic resin or epoxy resin by spin coating on the surface 11a of the disc substrate 11 on which the recording layer 12 has been formed and then curing the UV-curable resin. The adjustment layer 14 prevents warping due to stress differences in the disc substrate 11 on which the light transmitting layer 13 has been formed, and together with the print layer 15 corresponds to a "second functional layer" for the present invention. More specifically, as one example, the adjustment layer 14 is formed with a thickness of around 100 μm by applying a UV-curable resin (one example of a "second resin material" for the present invention) such as acrylic resin or epoxy resin that is the same as the resin material used to form the light transmitting layer 13 by spin coating on the rear surface 11b of the disc substrate 11 and then curing the UV-curable resin.

The print layer 15 is formed of a white underlayer (not shown) and a porous ink receiving layer (not shown) which includes voids so that various types of design and the like can be printed by an ink jet printer, for example. The white underlayer is formed by applying a coating liquid produced by mixing a white pigment, such as titanium oxide, into a UV-curable resin, such as acrylic resin, by screen printing, for example, onto the surface of the adjustment layer 14 and then curing the coating liquid (i.e., after printing) by emitting UV rays. Note that although there are no particular limitations on the thickness of the white underlayer, as one example, it is possible to make the white underlayer white by forming the white base underlayer with a thickness of 5 μm or greater. Also, when the white underlayer is formed excessively thickly, there is a risk of it being difficult to form the white underlayer with uniform thickness across the entire optical disc 1 without large changes in the degree of whiteness described above. For this reason, the thickness of the white underlayer should preferably be 20 μm or below.

On the other hand, the ink receiving layer is formed as a translucent thin film so that designs and the like can be printed by an ink jet printer, for example. The ink receiving layer functions so that ink expelled from a printer adheres to the optical disc 1. Here, to make it possible for a sufficient amount of ink to adhere in a short time, the thickness of the ink receiving layer should preferably be in a range of 10 μm to 50 μm, inclusive. Here, by sufficiently reducing the average roughness (Ra) of the surface of the ink receiving layer, it is possible to improve the print quality (in particular, the color brightness and luster) for the case where designs and the like are printed using a printer. More specifically, to achieve a print quality that is close to that of silver halide photography, it is preferable to set the average roughness (Ra) of the surface of the ink receiving layer at 0.1 μm or below. As one example, the ink receiving layer is formed by applying a coating liquid including boehmite and α alumina as pigments onto the surface of the white underlayer described above and then drying the coating liquid. Here, although there are no particular limitations on the method of applying the coating liquid to form the ink receiving layer, as examples, it is possible to use spin coating or slit coating.

When manufacturing the optical disc 1, first, the disc substrate 11 is injection molded using polycarbonate resin, for example. When doing so, the convex part 24 that corresponds to the first convex part for the present invention is formed on the surface 11a, and the convex part 25 that corresponds to the second convex part for the present invention and the convex part 26 that corresponds to the third convex part for the present invention are formed on the rear surface 11b. With the disc substrate 11, the convex part 25 is formed at a predetermined position on the rear surface 11b that overlaps the convex part 24 in the thickness direction of the disc substrate 11. Also, with the disc substrate 11, the convex part 24 is formed so that a top part thereof is a narrow ridge in the circumferential direction of the disc substrate 11. Accordingly, in a state (not shown) where a plurality of the disc substrates 11 for which injection molding has been completed are stacked for example by passing a stacking pole through the disc substrates 11, as one example the convex part 24 of a disc substrate 11 positioned below will make line contact with the convex part 25 of a disc substrate 11 positioned above.

Here, as described earlier, since the thickness of the disc substrate 11 is extremely thin, there are cases where the stacked disc substrates 11 deform so as to bend so that the convex part 26 of a disc substrate 11 positioned above contacts the surface 11a of a disc substrate 11 positioned below. In this state, the space between the rear surface 11b of the disc substrate 11 positioned above and the surface 11a of the disc substrate 11 positioned below will be sealed at the insides of the disc substrates 11 by the convex part 25 of the disc substrate 11 positioned above and the convex part 24 of the disc substrate 11 positioned below and will also be sealed at the outsides of the disc substrates 11 by the convex part 26 of the disc substrate 11 positioned above and the surface 11a of the disc substrate 11 positioned below.

However, with the disc substrate 11, as described above, since the convex part 24 of the disc substrate 11 positioned below makes line contact with the convex part 25 of the disc substrate 11 positioned above, compared to a state where surface contact is made between the first convex part and the second convex part for the present invention, it is possible for air in the periphery to easily enter the space between the surface 11a and the rear surface 11b of the disc substrates 11 from the contacting part of the convex parts 24, 25. This means that when a disc substrate 11 positioned above is lifted off the stack, it is possible to avoid a state where the space described above between the disc substrate 11 and the disc substrate 11 positioned below remains sealed, and as a result it is possible to avoid having the disc substrate 11 positioned below lifted off together with the disc substrate 11 above (i.e., where the disc substrate 11 positioned below sticks to the disc substrate 11 above).

Figure 3:
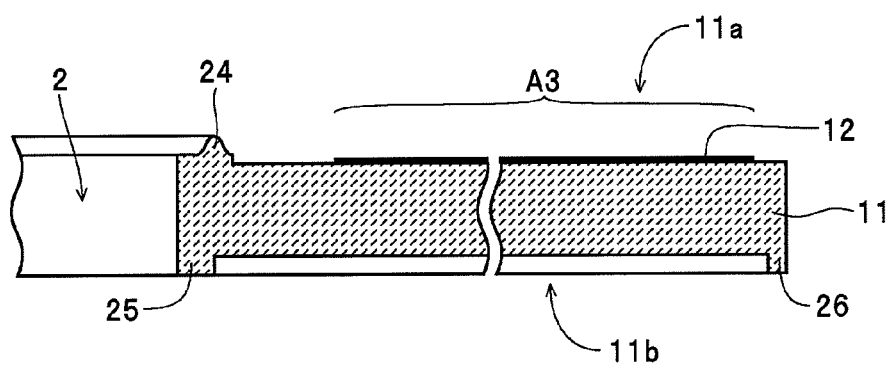
FIG. 3 is a cross-sectional view of the disc substrate in a state where a recording layer has been formed.
Figure 4:
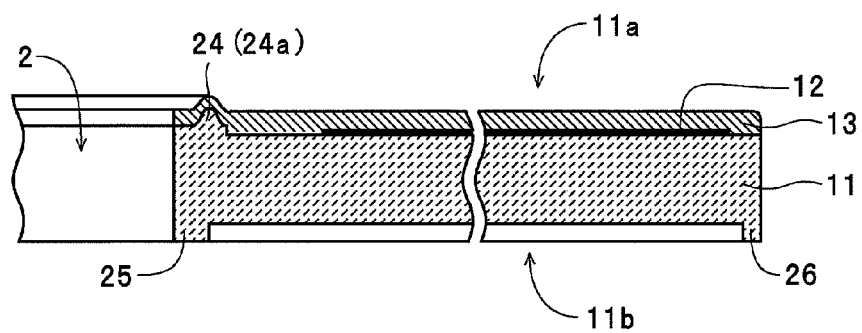
FIG. 4 is a cross-sectional view of the disc substrate in a state where a light transmitting layer has been formed.

Next, as shown in FIG. 3, the recording layer 12 is formed in the information region A3 of the surface 11a of the disc substrate 11 by forming a recording material layer, a dielectric layer, and the like after first forming a reflective film (not shown) by applying a metal material on the surface 11a of the disc substrate 11 by sputtering, for example. After this, as shown in FIG. 4, the light transmitting layer 13 is formed on the surface 11a of the disc substrate 11 by applying a UV-curable resin by spin coating, for example, on the recording layer 12 and curing the UV-curable resin. When doing so, the optical disc 1 is rotated at high speed after the resin material has been dripped onto the rim part of the attachment center hole 2 (i.e., onto the inner side of the convex part 24) on the surface 11a while the disc substrate 11 is being rotated at low speed. By doing so, the resin material moves toward the outer edge of the disc substrate 11, and as a result, as shown in FIG. 4, a layer of resin material is formed so as to cover the convex part 24 and the recording layer 12. In this state, the resin is irradiated with UV rays to cure the layer of the resin material and form the light transmitting layer 13.

Figure 5:
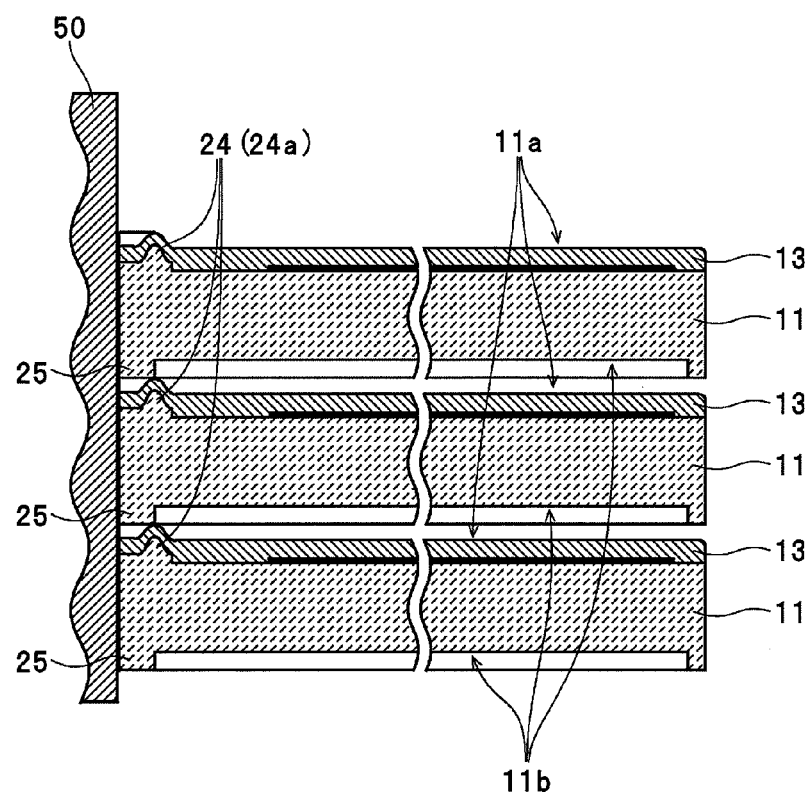
FIG. 5 is a cross-sectional view of a state where a plurality of the disc substrates shown in FIG. 4 have been stacked by passing a stacking pole through the substrates.

With the disc substrate 11, the convex part 24 is formed in the chucking region A2 of the surface 11a during injection molding. Accordingly, by forming the light transmitting layer 13 so as to cover the convex part 24, as shown in FIG. 4, a convex part 24a that is larger than the convex part 24 by the thickness of the light transmitting layer 13 is formed on the surface 11a of the disc substrate 11. On the disc substrate 11, the convex part 25 is formed at a predetermined position on the rear surface 11b that overlaps the convex part 24 in the thickness direction of the disc substrate 11. Accordingly, as shown in FIG. 5, when a plurality of the disc substrates 11 (or preforms) for which the formation of the light transmitting layer 13 has been completed are stacked by passing a stacking pole 50 through the disc substrates 11, as one example, the convex part 24a of a preform (disc substrate 11) positioned below will contact the convex part 25 of a preform (disc substrate 11) positioned above. As a result, a state is maintained where the light transmitting layer 13 of the lower preform and the disc substrate 11 of the upper preform are separated by 0.155 mm that is the total of the height H1 of the convex part 24 (the convex part 24a) and the height H2 of the convex part 25. By doing so, it is possible to prevent the stacked preforms from sticking together due to surface contact between the preforms and to avoid damage to the light transmitting layer 13 due to surface contact between the preforms.

Also, as described earlier, with the disc substrate 11, the convex part 24 is formed so that a top part thereof is a narrow ridge in the circumferential direction of the disc substrate 11. Accordingly, the convex part 24a described above, which is formed by forming the light transmitting layer 13 so as to cover the convex part 24, is also formed so that a top part thereof is a narrow ridge in the circumferential direction of the disc substrate 11. This means that in a state where a plurality of disc substrates 11 for which the formation of the light transmitting layer 13 has been completed are stacked by passing the stacking pole 50 through the disc substrates 11, the convex part 24a of a disc substrate 11 positioned below will make line contact with the convex part 25 of a disc substrate 11 positioned above.

Accordingly, even if the stacked disc substrates 11 deform so as to bend so that the convex part 26 of a disc substrate 11 positioned above contacts the surface 11a (i.e., the surface of the light transmitting layer 13) of a disc substrate 11 positioned below, it will be possible for air in the periphery to easily enter the space between the surface 11a (i.e., the surface of the light transmitting layer 13) and the rear surface 11b of the disc substrates 11 via the contacting part of the convex parts 24a, 25. This means that when a disc substrate 11 positioned above is lifted off the stack, it is possible to avoid a state where the space described above between the disc substrate 11 and the disc substrate 11 positioned below remains sealed, and as a result it is possible to avoid having the disc substrate 11 positioned below lifted off together with the disc substrate 11 above (i.e., where the disc substrate 11 positioned below sticks to the disc substrate 11 positioned above).

Figure 6:
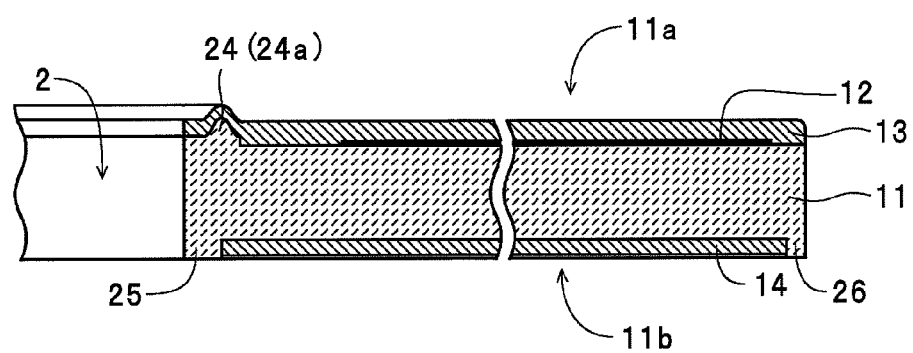
FIG. 6 is a cross-sectional view of the disc substrate in a state where an adjustment layer has been formed.
Figure 7:
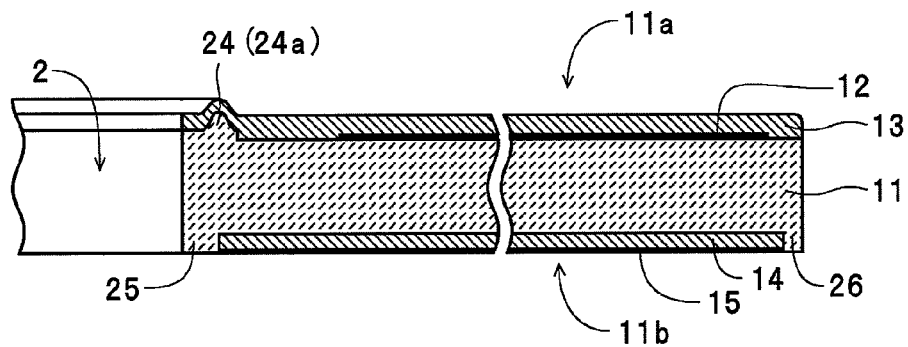
FIG. 7 is a cross-sectional view of the disc substrate in a state where a print layer has been formed.

Next, as shown in FIG. 6, the adjustment layer 14 is formed by applying a resin material onto the rear surface 11b of the disc substrate 11 by screen printing and then curing the resin material. When doing so, by applying the resin material in a ring-shaped region between the convex parts 25, 26 on the rear surface 11b, the surfaces of the convex parts 25, 26 will be exposed from the layer of resin material. After this, as shown in FIG. 7, the print layer 15 is formed on the surface of the adjustment layer 14. More specifically, first a coating liquid for forming the white underlayer is screen printed onto the surface of the adjustment layer 14 and then UV rays are emitted onto the applied film to cure the film. Next, after a coating liquid for forming the ink receiving layer has been applied onto the surface of the white underlayer described above, the coating liquid is dried. By doing so, the print layer 15 is formed. Note that with the optical disc 1, the adjustment layer 14 and the print layer 15 described above are formed so that the total of the thicknesses of the adjustment layer 14 and the print layer 15 is equal to the heights H2, H3 of the convex parts 25, 26. By doing so, the optical disc 1 is completed as shown in FIG. 1.

In this way, according to the disc substrate 11 of the optical disc 1, the convex part 24 that corresponds to the first convex part for the present invention is formed on one surface (in this example, the surface 11a) in a region (in this example, the chucking region A2) between the rim part of the attachment center hole 2 and the inner circumferential edge of the information region A3 and the convex part 25 that corresponds to the second convex part for the present invention is formed on the other surface (in this example, the rear surface 11b) at a position that overlaps the protruding end part of the convex part 24 in the thickness direction. By doing so, during the manufacturing of the optical disc 1, when the disc substrates 11 are stacked in a state where the formation of the light transmitting layer 13 has been completed (i.e., in a state where the formation of the adjustment layer 14 has not been completed), the light transmitting layer 13 and the disc substrate 11 can be sufficiently separated by the total of the height H1 of the convex part 24 (the convex part 24a) and the height H2 of the convex part 25 (in this example, by a height of around 0.155 mm). Accordingly, even if the convex part 25 is formed sufficiently low so as to avoid recording/reproducing errors and the like, it will still be possible to reliably prevent the stacked disc substrates 11 from sticking together and to reliably avoid damage to the disc substrate 11 and the light transmitting layer 13. Also, since there is no excessively high convex part, it is possible to avoid a situation where recording/reproducing processes and print processes on the label surface are obstructed due to the presence of a convex part.

Also, according to the disc substrate 11 of the optical disc 1, by forming at least one of the first convex part and the second convex part for the present invention (in this example, both of the convex parts 24, 25) so as to be ring-shaped in planar form, when a plurality of the disc substrates 11 are stacked, regardless of the rotational position of an upper disc substrate 11 relative to a lower disc substrate 11 during stacking, reliable contact will be made between the convex part 24 (the convex part 24a) of the lower disc substrate 11 and the convex part 25 of the upper disc substrate 11 or between the convex part 25 of the lower disc substrate 11 and the convex part 24 (the convex part 24a) of the upper disc substrate 11. Accordingly, it will be possible to reliably keep the disc substrates 11 (specifically, the rear surface 11b of the upper disc substrate 11 and the surface 11a of the lower disc substrate 11) separated by the total of the height of both convex parts 24, 25.

Also, according to the disc substrate 11 of the optical disc 1, by forming at least one of the first convex part and the second convex part for the present invention (in this example, only the convex part 24 corresponding to the first convex part) so that a top part thereof is a narrow ridge in the circumferential direction of the disc substrate 11, when a plurality of disc substrates 11 are stacked, it will be possible for air in the periphery to easily enter the space between a disc substrate 11 positioned above and a disc substrate 11 positioned below from the contacting part of the convex part 24 (the first convex part) and the convex part 25 (the second convex part). Therefore, according to the disc substrate 11, when a disc substrate 11 positioned above is lifted off the stack, it is possible to avoid a state where the space described above between the disc substrate 11 and the disc substrate 11 positioned below remains sealed, and as a result it is possible to avoid having the disc substrate 11 positioned below lifted off together with the disc substrate 11 above (i.e., where the disc substrate 11 positioned below sticks to the disc substrate 11 above). This makes it possible to lift off only the disc substrate 11 positioned above.

In addition, according to the disc substrate 11 of the optical disc 1, by forming the convex part 26 that corresponds to the third convex part for the present invention inside a region (in this example, the outer edge region A4) outside the information region A3 on at least one of the one surface or the other surface (in this example, the rear surface 11b corresponding to the "other surface"), when a plurality of disc substrates 11 are stacked, even if the disc substrates 11 are inclined, the convex part 26 of a disc substrate 11 positioned above will contact the surface 11a of a disc substrate 11 positioned below, for example, thereby making it possible to reliably avoid surface contact between the disc substrates 11. Accordingly, for stacked disc substrates 11, it is possible to prevent the disc substrates 11 from sticking together and to avoid damage even more reliably.

According to the optical disc 1, the light transmitting layer 13 corresponding to the "first functional layer" for the present invention is formed by applying a first resin material (in this example, a UV-curable resin that transmits light) so as to cover the convex part 24 on the surface 11a of the disc substrate 11 and the adjustment layer 14 corresponding to the "second functional layer" for the present invention is formed with a height in the thickness direction that is equal to or greater than the height of the convex part 25 by applying a second resin material (in this example, the same UV-curable resin as the first resin material) on a region outside the convex part 25 on the rear surface 11b (in this example, the region A5 between the convex part 25 and the convex part 26). As a result, during a print process on the print layer 15 as the second functional layer for the present invention, it is possible to reliably avoid a situation where printing is obstructed due to the printing apparatus catching on the convex part 25.

Figure 8:
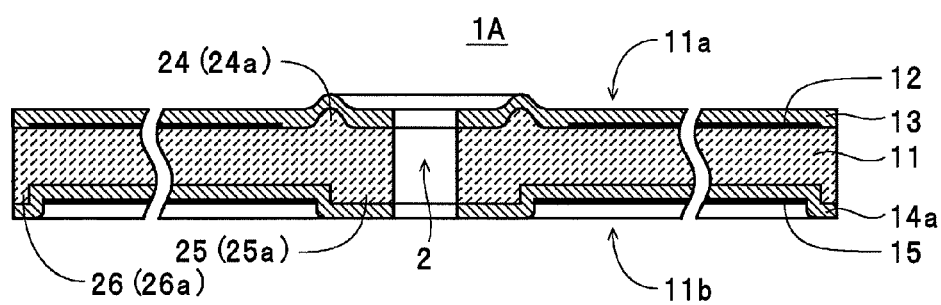
FIG. 8 is a cross-sectional view showing the construction of another optical disc.
Figure 9:
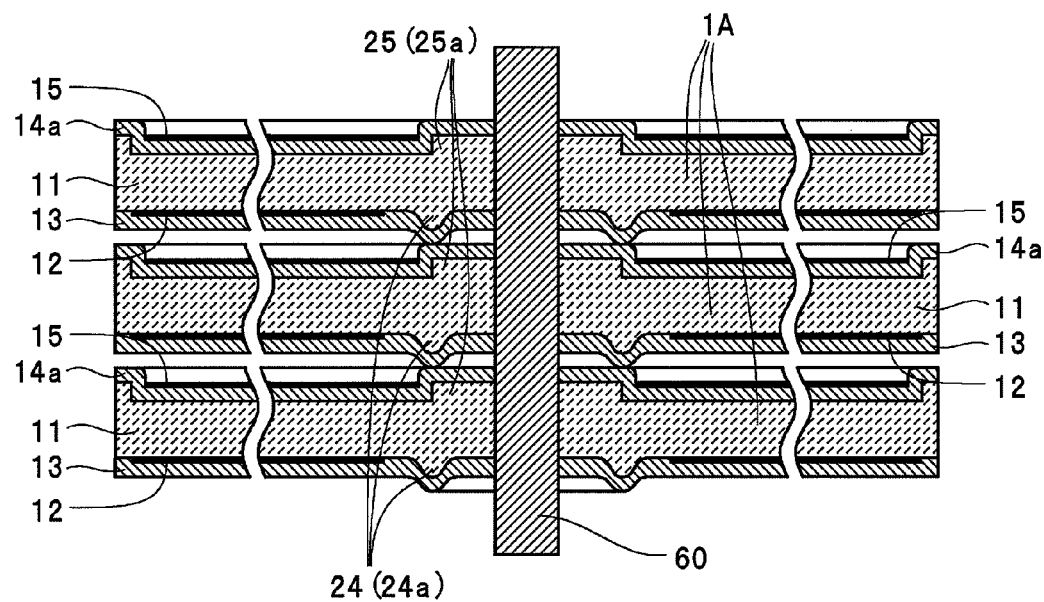
FIG. 9 is a cross-sectional view of a state where a plurality of the optical discs shown in FIG. 8 have been stacked by passing a stacking pole through the optical discs.

Note that the present invention is not limited to the construction and method described above. For example, with the optical disc 1 described above, although a construction where the adjustment layer 14 is formed by applying the resin material in the region A5 between the convex parts 25, 26 formed on the rear surface 11b of the disc substrate 11, the present invention is not limited to this, and like an optical disc 1A shown in FIG. 8, it is possible to use a construction where an adjustment layer 14a (another example of the second functional layer for the present invention) is formed by applying a resin material so as to cover the convex parts 25, 26. When this construction is used, the convex part 25a that is larger than the convex part 25 by the thickness of the adjustment layer 14a and the convex part 26a that is larger than the convex part 26 by the thickness of the adjustment layer 14a are formed on the rear surface 11b of the disc substrate 11. Accordingly, as shown in FIG. 9, when a plurality of completed optical discs 1A have been stacked by passing the stacking pole 60 through the optical discs 1A, the convex part 25a of an optical disc 1A positioned below will contact the convex part 24a of an optical disc 1A positioned above, thereby separating the optical discs 1A by the total height of the convex parts 24a, 25a. Note that when the optical discs 1A are inverted and stacked with the formation surface of the light transmitting layer 13 facing upward (not shown), the convex part 24a of an optical disc 1A positioned below will contact the convex part 25 of an optical disc 1A positioned above, thereby separating the optical discs 1A by the total height of the convex parts 24a, 25a.

In this way, according to the optical disc 1A, the light transmitting layer 13 that corresponds to the first functional layer for the present invention is formed by applying the first resin material (in this example, a UV-curable resin that transmits light) so as to cover the convex part 24 on the surface 11*a* of the disc substrate 11 and the adjustment layer 14*a* that corresponds to the second functional layer for the present invention is formed by applying the second resin material (in this example, a UV-curable resin that transmits light) so as to cover the convex part 25 and the convex part 26 on the rear surface 11*b*. By doing so, it is possible to achieve a state where the convex parts 25*a*, 26*a* protrude outward on the rear surface 11*b* side not only for a preform during manufacturing of the optical disc 1A but also for a completed optical disc 1A. Accordingly, even if the convex parts 25*a*, 26*a* are formed sufficiently low, when a plurality of the completed optical discs 1A are stacked, the convex part 24*a* formed on the surface 11*a* and the convex part 25*a* formed on the rear surface 11*b* will together reliably prevent surface contact between two optical discs 1A. By doing so, when a plurality of the completed optical discs 1A are stacked, it is possible to reliably prevent the optical discs 1A from sticking together and to reliably avoid damage.

Figure 10:
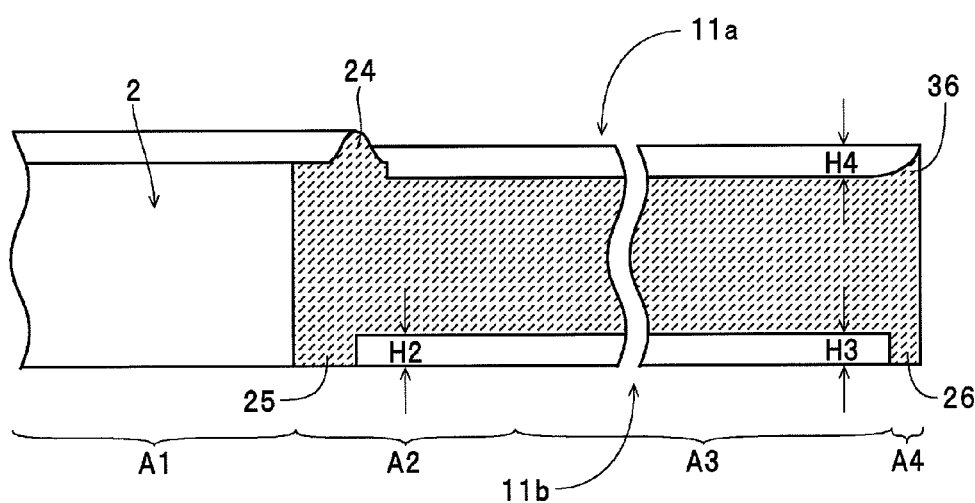
FIG. 10 is a cross-sectional view of another disc substrate.

Also, although the disc substrate 11 described above uses a construction where the convex part 26 that corresponds to the third convex part for the present invention is formed on only the rear surface 11*b*, like a disc substrate 31 shown in FIG. 10 (another example of an information medium substrate according to the present invention), it is possible to use a construction where a convex part 36 that is ring shaped in planar form and corresponds to the third convex part for the present invention is also formed on the surface 11*a* corresponding to the "one surface" for the present invention. Note that component elements of the disc substrate 31 shown in FIG. 10 and of the disc substrates 41, 51A to 51E, 61 described later that have the same functions as the component elements of the disc substrate 11 described earlier have been assigned the same reference numerals and duplicated description thereof has been omitted. With this present construction, when one or more disc substrates 31 becomes inclined or deformation that bends one or more disc substrates 31 occurs in a state where a plurality of the disc substrates 31 have been stacked, a convex part 36 of a disc substrate 31 positioned below and a convex part 26 of a disc substrate 31 positioned above will contact one another, for example. As a result, it is possible to reliably avoid tight contact (i.e., sealing) between the disc substrate 31 positioned below and the disc substrate 31 positioned above. Here, the height H4 of the convex part 36 formed in the outer edge region A4 of the surface 11*a* should preferably be set at around 0.08 mm, for example, so as to sufficiently prevent the tight contact (i.e., sealing) described above from occurring while not obstructing the flow of the resin material during formation of the light transmitting layer 13.

Figure 11:
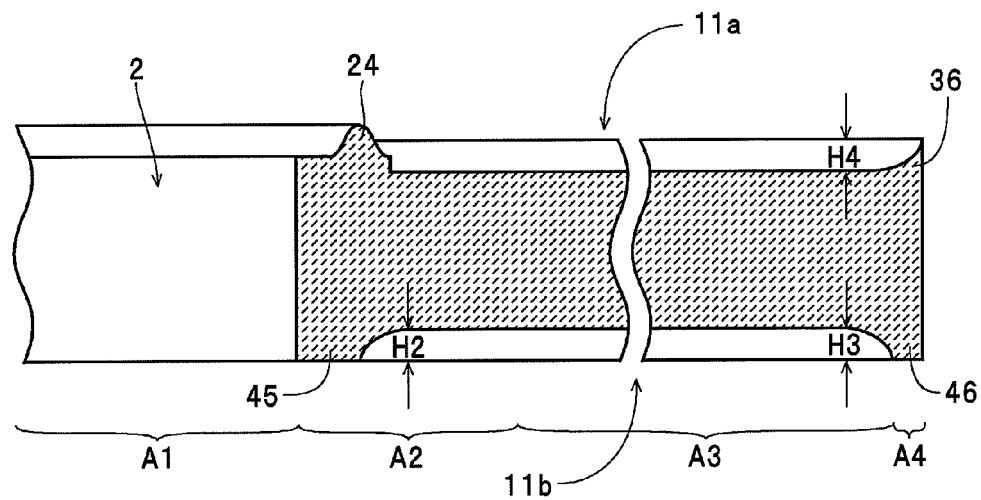
FIG. 11 is a cross-sectional view of yet another disc substrate.

Like a disc substrate 41 shown in FIG. 11 (yet another example of an information medium substrate according to the present invention), by forming convex parts 45, 46 (another example of second and third convex parts for the present invention) on the rear surface 11*b* side on which the adjustment layer 14 is formed so that rim parts of the convex parts 45, 46 are shaped as gradual arcs in cross section, it is possible to cause the resin material that forms the adjustment layer 14 to reliably make tight contact with the rear surface 11*b* of the disc substrate 41. In addition, although the disc substrate 11 described earlier uses a construction where both the convex part 24 that corresponds to the first convex part for the present invention and the convex part 25 that corresponds to the second convex part for the present invention are formed so as to be ring shaped in planar form, even if only one out of the first convex part and the second convex part for the present invention is formed so as to be ring shaped in planar form, in the same way as the disc substrate 11 and the like described above, when a plurality of disc substrates are stacked, regardless of the rotational position of an upper disc substrate relative to a lower disc substrate 11 during stacking, reliable contact will be made between the first convex part of a lower disc substrate and the second convex part of an upper disc substrate or between the second convex part of a lower disc substrate and the first convex part of an upper disc substrate, thereby making it possible to reliably separate the disc substrates by the total height of the convex parts.

Figure 12:
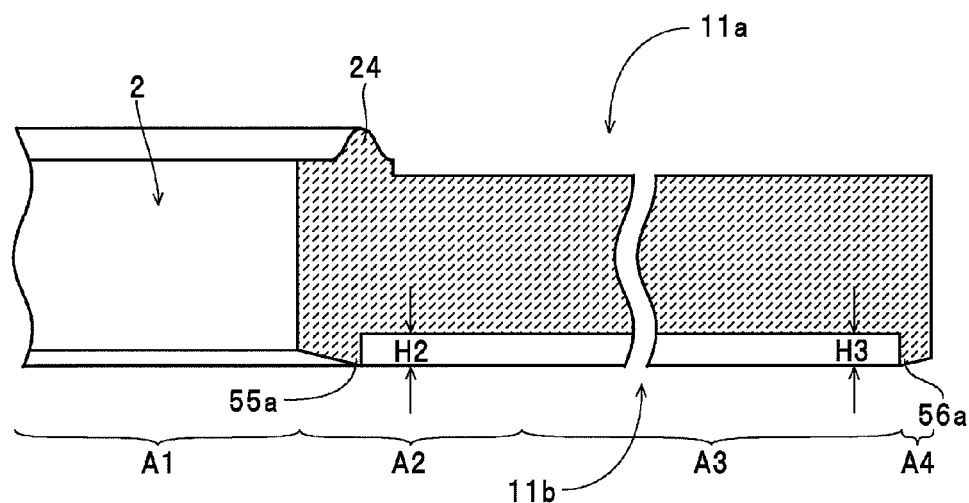
FIG. 12 is a cross-sectional view of yet another disc substrate.
Figure 13:
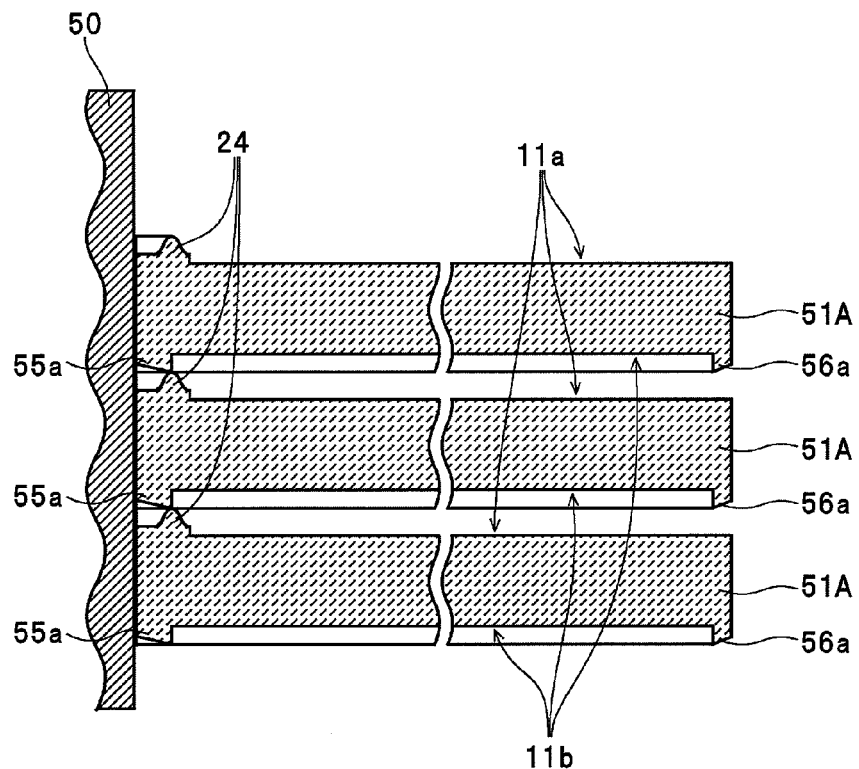
FIG. 13 is a cross-sectional view of a state where a plurality of the disc substrates shown in FIG. 12 have been stacked by passing a stacking pole through the disc substrates.

In addition, although the disc substrates 11, 31, and 41 where the convex part 24 that corresponds to the first convex part for the present invention is formed so that a top part thereof is a narrow ridge in the circumferential direction of the disc substrate 11 have been described, the present invention is not limited to this. For example, like a disc substrate 51A shown in FIG. 12, it is possible to construct a convex part 55*a* that corresponds to the second convex part for the present invention so that a top part thereof is a narrow ridge in the circumferential direction of the disc substrate 51A by forming a protruding end surface of the convex part 55*a* as a surface that is inclined toward the inside so as to become lower toward the center of the disc substrate (i.e., so that the distance from the base end of the convex part to the protruding end surface decreases toward the center of the disc substrate) and it is possible to construct a convex part 56*a* that corresponds to the third convex part for the present invention so that a top part thereof is a narrow ridge in the circumferential direction of the disc substrate 51A by forming the protruding end surface of the convex part 56*a* as a surface that is inclined toward the outside so as to become lower toward the outside of the disc substrate (i.e., so that the distance from the base end of the convex part to the protruding end surface decreases toward the outside of the disc substrate). With this disc substrate 51A, like the disc substrate 11 described earlier, as shown in FIG. 13, when a plurality of the disc substrates 51A for which injection molding has been completed, for example, are stacked such as by passing the stacking pole 50 through the disc substrates 51A, the convex part 55*a* of a disc substrate 51A positioned above will make line contact with the convex part 24 of a disc substrate 51A positioned below.

Also, when deformation that bends one or more of the disc substrates 51A has occurred, as one example, the convex part 56*a* of a disc substrate 51A positioned above will make line contact with the surface 11*a* of a disc substrate 51A positioned below. Accordingly, compared to when surface contact is made between the first convex part and the second convex part for the present invention or when surface contact is made between the third convex part for the present invention and the one surface for the present invention, it will be possible for air in the periphery to easily enter the space between the surface 11*a* and the rear surface 11*b* of both disc substrates 51A from the contacting part of the convex parts 24, 55*a* and from the contacting part of the convex part 56*a* and the surface 11*a*. This means that when a disc substrate 51A positioned above is lifted off the stack, it is possible to avoid a state where the space described above between the disc substrate 51A and the disc substrate 51A positioned below remains sealed, and as a result it is possible to avoid having the disc substrate 51A positioned below lifted off together with the disc substrate 51A above (i.e., where the disc substrate 51A positioned below sticks to the disc substrate 51A above).

Figure 14:
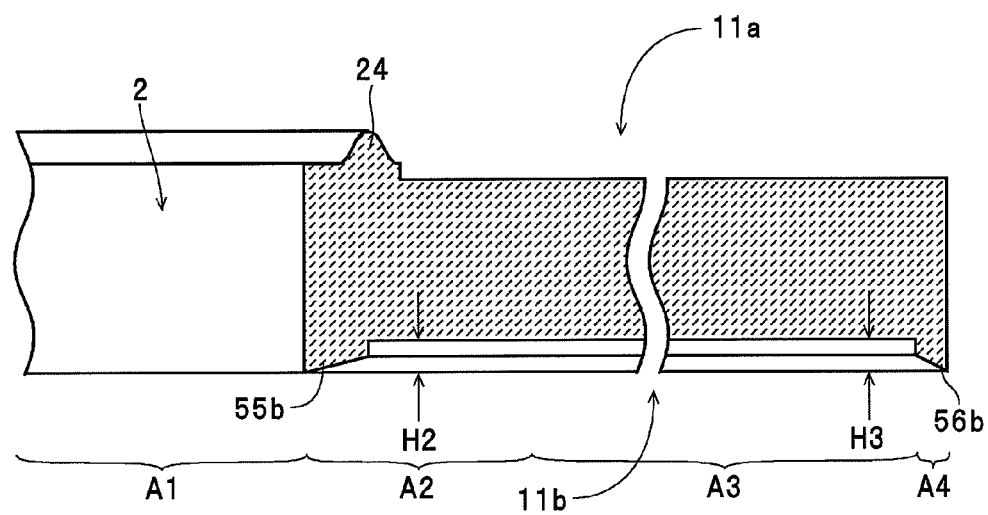
FIG. 14 is a cross-sectional view of yet another disc substrate.
Figure 15:
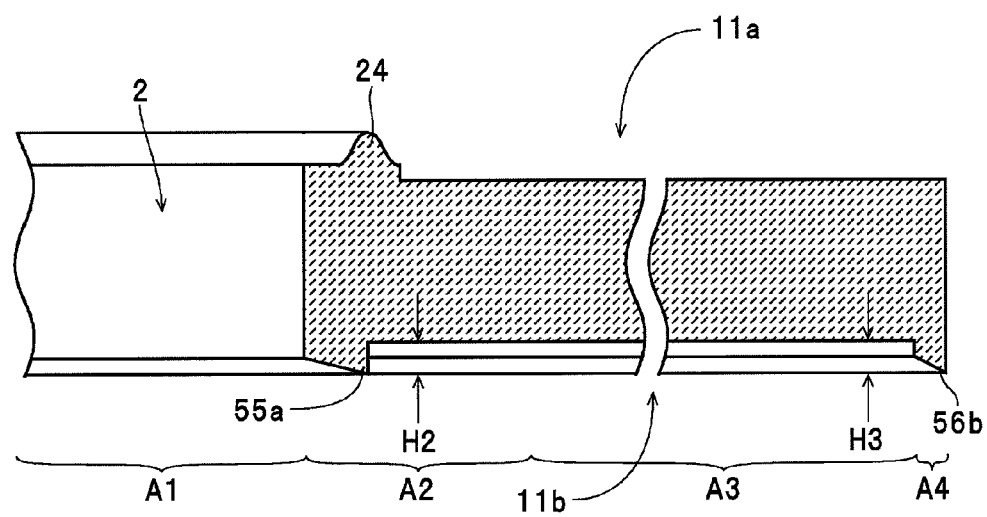
FIG. 15 is a cross-sectional view of yet another disc substrate.

Here, the cross-sectional form used to provide the second convex part and the third convex part for the present invention with a top part shaped as a narrow ridge is not limited to the form of the convex parts 55*a*, 56*a* of the disc substrate 51A described above. More specifically, like a disc substrate 51B shown in FIG. 14, by making a protruding end surface of a convex part 55b that corresponds to the second convex part for the present invention a surface that is inclined toward the outside of the disc substrate 51B, it is possible to construct the convex part 55b so that the top part thereof is a narrow ridge in the circumferential direction of the disc substrate 51B, and by making a protruding end surface of a convex part 56b that corresponds to the third convex part for the present invention a surface that is inclined toward the center of the disc substrate 51B, it is possible to construct the convex part 56b so that the top part thereof is a narrow ridge in the circumferential direction of the disc substrate 51B. Alternatively, like a disc substrate 51C shown in FIG. 15, it is possible to use a construction where the convex part 55a is formed as the second convex part for the present invention in the same way as on the disc substrate 51A described above and the convex part 56b is formed as the third convex part for the present invention in the same way as on the disc substrate 51B described above, and like a disc substrate 51D shown in FIG. 16, it is possible to use a construction where the convex part 55b is formed as the second convex part for the present invention in the same way as on the disc substrate 51B described above and where the convex part 56a is formed as the third convex part for the present invention in the same way as on the disc substrate 51A described above.

In addition, like a disc substrate 51E shown in FIG. 17, it is possible to construct a convex part 55e that corresponds to the second convex part for the present invention so as to have a top part shaped as a narrow ridge in the circumferential direction of the disc substrate 51E by forming the protruding end surface of the convex part 55e as two inclined surfaces composed of a surface inclined toward the center and a surface inclined toward the outside and to construct a convex part 56e that corresponds to the third convex part for the present invention so as to have a top part shaped as a narrow ridge in the circumferential direction of the disc substrate 51E by forming the protruding end surface of the convex part 56e as two inclined surfaces composed of a surface inclined toward the center and a surface inclined toward the outside. Note that the information medium substrate according to the present invention is not limited to a construction like the disc substrates 51A to 51E (hereinafter collectively referred to as the "disc substrate 51") where both the second convex part and the third convex part for the present invention have a top part shaped as a narrow ridge, and it is possible to use a construction where only one out of the second convex part and the third convex part for the present invention has a top part shaped as a narrow ridge.

In this way, according to the disc substrate 51 described above, by forming at least one out of the first convex part and the second convex part for the present invention (in this example, both) so that a top part thereof is a narrow ridge in the circumferential direction of the disc substrate 51, when the disc substrates 51 are stacked, it will be possible for air in the periphery to easily enter the space between a disc substrate 51 positioned above and a disc substrate 51 positioned below from the contacting part of the first convex part and the second convex part. Accordingly, according to the disc substrate 51, when a disc substrate 51 positioned above is lifted off the stack, it is possible to avoid a state where the space described above between the disc substrate 51 and the disc substrate 51 positioned below remains sealed, and as a result it is possible to avoid having the disc substrate 51 positioned below lifted off together with the disc substrate 51 above (i.e., where the disc substrate 51 positioned below sticks to the disc substrate 51 above). This makes it possible to lift off only the disc substrate 51 positioned above.

Also, according to the disc substrate 51 described above, by forming the top part of the third convex part for the present invention as a narrow ridge in the circumferential direction of the disc substrate 51, when the disc substrates 51 are stacked, it is possible for air in the periphery to easily enter the space between a disc substrate 51 positioned above and a disc substrate 51 positioned below from the contacting part of the surface 11a and the third convex part. Therefore, according to the disc substrate 51, when a disc substrate 51 positioned above is lifted off the stack, it is possible to avoid a state where the space described above between the disc substrate 51 and the disc substrate 51 positioned below remains sealed, and as a result it is possible to avoid having the disc substrate 51 positioned below lifted off together with the disc substrate 51 above (i.e., where the disc substrate 51 positioned below sticks to the disc substrate 51 above). This makes it possible to lift off only the disc substrate 51 positioned above.

Figure 18:
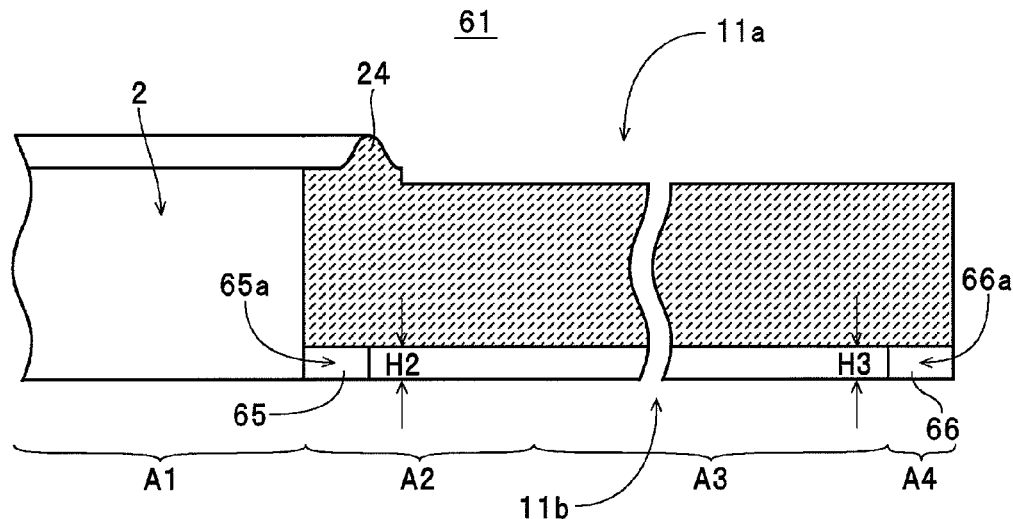
FIG. 18 is a cross-sectional view of yet another disc substrate.
Figure 19:
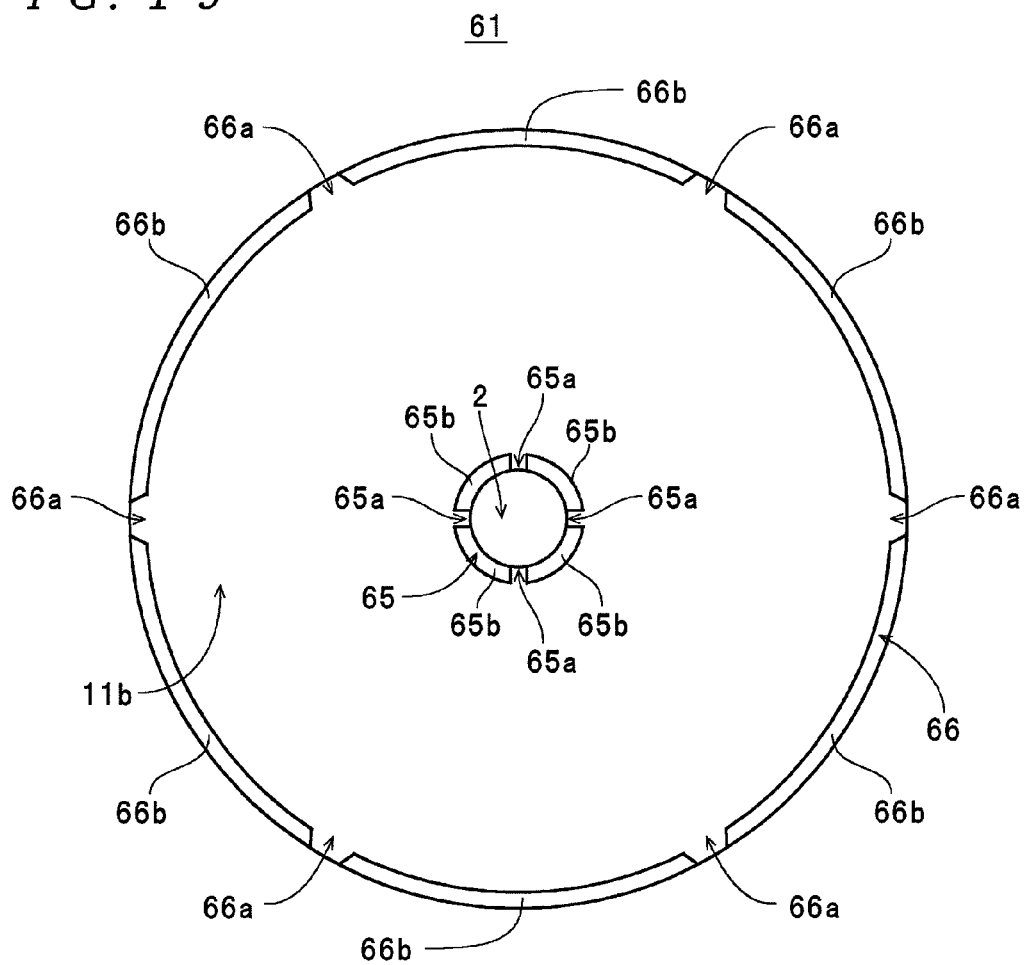
FIG. 19 is a plan view of the disc substrate shown in FIG. 18 when viewed from the rear surface side.

Also, although both the convex part 24 that corresponds to the first convex part for the present invention and the convex part 25 that corresponds to the second convex part for the present invention are formed so as to be ring-shaped in planar form and the convex part 26 that corresponds to the third convex part for the present invention is formed so as to be ring-shaped in planar form on the disc substrate 11 described above for example, the information medium substrate according to the present invention is not limited to this. For example, like a disc substrate 61 shown in FIGS. 18 and 19, it is possible to form the convex part 24 that corresponds to the first convex part for the present invention so as to be ring-shaped in planar form, to construct a convex part 65 that corresponds to the second convex part for the present invention as a plurality of arc-shaped convex parts that are adjacent in the circumferential direction of the disc substrate 61 with predetermined gaps in between, and to construct a convex part 66 that corresponds to the third convex part for the present invention as a plurality of arc-shaped convex parts that are adjacent in the circumferential direction of the disc substrate 61 with predetermined gaps in between.

More specifically, with the disc substrate 61, the convex part 65 that corresponds to the second convex part for the present invention is formed on the rear surface 11b (one example of the "other surface" for the present invention) in the chucking region A2 between a rim part (the outer circumferential end of a center hole formation region A1) of the attachment center hole 2 and an inner edge of the information region A3 in which the recording layer 12 is formed. Here, the convex part 65 is constructed by forming four arc-shaped convex parts 65b that are adjacently aligned in the circumferential direction of the disc substrate 61 and are separated by four cutaway parts 65a corresponding to the "predetermined gaps" for the present invention. The respective convex parts 65b that construct the convex part 65 are formed at predetermined positions on the rear surface 11b so as to overlap the protruding end part of the convex part 24 described above in the thickness direction of the optical disc 1. The convex part 66 that is one example of the third convex part for the present invention is formed in the outer edge region A4 that is outside the information region A3 on the rear surface 11b. Here, the convex part 66 is constructed by forming six arc-shaped convex parts 66b that are adjacently aligned in the circumferential direction of the disc substrate 61 and are separated by six cutaway parts 66a corresponding to the "predetermined gaps" for the present invention.

With the disc substrate 61, in a state (not shown) where a plurality of the disc substrates 61 for which injection molding has been completed are stacked by passing a stacking pole through the disc substrates 61, for example, the convex part 65 of a disc substrate 61 positioned above will contact the convex part 24 of a disc substrate 61 positioned below at four positions corresponding to the formation positions of the four convex parts 65b that construct the convex part 65. Meanwhile, at the formation positions of the cutaway parts 65a, the disc substrate 61 positioned above will not contact the disc substrate 61 positioned below. Also, even in a state where deformation that bends one or more of the stacked disc substrates 61 occurs and the convex part 66 of the disc substrate 61 positioned above contacts the surface 11a of the disc substrate 61 positioned below, the convex part 66 of the disc substrate 61 positioned above will contact the surface 11a of the disc substrate 61 positioned below at six positions corresponding to the formation positions of the six convex parts 66b that construct the convex part 66. Meanwhile, at the formation positions of the cutaway parts 66a, the disc substrate 61 positioned above will not contact the disc substrate 61 positioned below. Accordingly, with the disc substrate 61, it will be possible for air in the periphery to easily enter the space between the surface 11a and the rear surface 11b of both disc substrates 61 from the cutaway parts 65a, 66a.

In this way, according to the disc substrate 61, by constructing the other out of the first convex part and the second convex part (in this example, the convex part 65 that corresponds to the second convex part for the present invention) of a plurality of arc-shaped convex parts 65b that are adjacent in the circumferential direction of the disc substrate 61 with predetermined gaps (in this example, the cutaway parts 65a) in between, when a plurality of the disc substrates 61 are stacked, it will be possible for air in the periphery to easily enter the space between the disc substrate 61 positioned above and the disc substrate 61 positioned below from the cutaway parts 65a (i.e., from the predetermined gaps). When a disc substrate 61 positioned above is lifted off the stack, it is possible to avoid a state where the space described above between the disc substrate 61 and a disc substrate 61 positioned below remains sealed, and as a result it is possible to avoid having the disc substrate 61 positioned below lifted off together with the disc substrate 61 above (i.e., where the disc substrate 61 positioned below sticks to the disc substrate 61 above). This makes it possible to lift off only the disc substrate 61 positioned above.

Also, according to the disc substrate 61, by constructing the third convex part (i.e., the convex part 66) from a plurality of arc-shaped convex parts 66b that are adjacent in the circumferential direction of the disc substrate 61 with predetermined gaps (in this example, the cutaway parts 66a) in between, when a plurality of the disc substrates 61 are stacked, it will be possible for air in the periphery to easily enter the space between the disc substrate 61 positioned above and the disc substrate 61 positioned below from the cutaway parts 66a (the predetermined gaps). When a disc substrate 61 positioned above is lifted off the stack, it is possible to avoid a state where the space described above between the disc substrate 61 and a disc substrate 61 positioned below remains sealed, and as a result it is possible to avoid having the disc substrate 61 positioned below lifted off together with the disc substrate 61 above (i.e., where the disc substrate 61 positioned below sticks to the disc substrate 61 above). This makes it possible to lift off only the disc substrate 61 positioned above.

Note that the number of cutaway parts 65a, 66a for forming the predetermined gaps for the present invention (that is, the number of the arc shaped convex parts 65b that construct the convex part 65 and the number of the arc shaped convex parts 66b that construct the convex part 66) are not limited to the examples described above. Also, the present invention is not limited to the above construction where the cutaway parts 65a, 66a that correspond to the predetermined gaps for the present invention are formed in both the second convex part and the third convex part for the present invention and it is possible to use a construction where the cutaway parts 65a or the cutaway parts 66a are formed in only one out of the second convex part and the third convex part. In addition, it is possible to use a construction where cutaway parts (predetermined gaps) are provided in the convex part (the convex part 24 of the disc substrate 11 and the like described above) that corresponds to the first convex part for the present invention so that the first convex part is constructed of a plurality of arc-shaped convex parts. With this construction also, it is possible to achieve the same effect as the disc substrate 61 described above. In addition, it is possible for the top parts of the respective arc-shaped convex parts to be formed as narrow ridges in the circumferential direction of the information medium substrate.

The information medium according to the present invention is not limited to an optical recording medium and includes a magneto-optical recording medium and a magnetic recording medium. In addition, although a construction where a white underlayer is provided between the ink receiving layer and the disc substrate 11 has been described, as examples it is also possible to omit the white underlayer and use a construction where the disc substrate 11 is made white by mixing a white pigment such as titanium oxide into the resin material used to mold the disc substrate 11 or a construction where the ink receiving layer is made white by mixing a white pigment such as titanium oxide into the coating liquid that forms the ink receiving layer.

What is claimed is:

1. An information medium substrate that is formed as a flat plate and comprises:
    an information region formed on one surface of the information medium substrate, the one surface of the information medium substrate being formed with a light transmitting layer so as to cover the information region;
    a first convex part formed on the one surface of the information medium substrate in a region between a rim part of a center hole and an inner circumferential edge of the information region; and
    a second convex part formed on another surface of the information medium substrate at a position that overlaps a protruding end part of the first convex part in a thickness direction of the information medium substrate, the another surface of the information medium substrate opposing the one surface of the information medium substrate,
    wherein:
    the entire region outside the first convex part on the one surface of the information medium substrate is formed smooth,
    a third convex part is formed in a region outside the information region on the another surface,
    the first convex part is formed higher than a recording layer that is formed in the information region,
    the first convex part and the second convex part are integrally formed with the information medium substrate, and
    an information region is not formed on the another surface of the information medium substrate.

2. An information medium substrate according to claim 1, wherein at least one out of the first convex part and the second convex part is formed so as to be ring-shaped in planar form.

3. An information medium substrate according to claim 1, wherein one out of the first convex part and the second convex part is formed so as to be ring-shaped in planar form and the other out of the first convex part and the second convex part is constructed of a plurality of arc-shaped convex parts that are adjacent in a circumferential direction of the information medium substrate with predetermined gaps in between.

4. An information medium substrate according to claim 1, wherein at least one out of the first convex part and the second convex part is formed so that a top part thereof is a narrow ridge in the circumferential direction of the information medium substrate.

5. An information medium substrate according to claim 1, wherein the third convex part is constructed of a plurality of arc-shaped convex parts that are adjacent in a circumferential direction of the information medium substrate with predetermined gaps in between.

6. An information medium substrate according to claim 1, wherein the third convex part is formed so that a top part thereof is a narrow ridge in the circumferential direction of the information medium substrate.

7. An information medium comprising:
a first functional layer formed by applying a first resin material onto the one surface of the information medium substrate according to claim 1 so as to cover the first convex part and the recording layer formed in the information region, the first functional layer comprising a light transmitting layer; and
a second functional layer formed by applying a second resin material onto a region outside the second convex part on the another surface of the information medium substrate so that a height of the second functional layer in the thickness direction is equal to or greater than a height of the second convex part.

8. An information medium comprising:
a first functional layer formed by applying a first resin material onto the one surface of the information medium substrate according to claim 1 so as to cover the first convex part and the recording layer formed in the information region, the first functional layer comprising a light transmitting layer; and
a second functional layer formed by applying a second resin material onto the another surface of the information medium substrate so as to cover the second convex part.

* * * * *